United States Patent
Park et al.

(10) Patent No.: US 8,282,228 B2
(45) Date of Patent: Oct. 9, 2012

(54) LIQUID CRYSTAL DISPLAY DEVICE

(75) Inventors: Dong Seo Park, Yeongju-si (KR); Yeon Chae Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 433 days.

(21) Appl. No.: 12/567,447

(22) Filed: Sep. 25, 2009

(65) Prior Publication Data

US 2010/0142187 A1 Jun. 10, 2010

(30) Foreign Application Priority Data

Dec. 9, 2008 (KR) ........................ 10-2008-0124911

(51) Int. Cl.
*G09F 13/00* (2006.01)
(52) U.S. Cl. .................. 362/97.2; 362/97.1; 362/217.13; 362/221; 349/70; 439/56; 439/235
(58) Field of Classification Search ........ 362/97.1–97.3, 362/217.01, 217.09–217.17, 225, 249.01, 362/249.07, 249.11, 382, 613, 221; 439/56, 439/235; 349/70
See application file for complete search history.

(56) References Cited

U.S. PATENT DOCUMENTS

| | | | | |
|---|---|---|---|---|
| 4,864,475 | A * | 9/1989 | Jung | 362/231 |
| 6,949,890 | B2 * | 9/2005 | Chou et al. | 315/294 |
| 7,588,346 | B2 * | 9/2009 | Lee et al. | 362/225 |
| 2004/0257793 | A1 * | 12/2004 | Wakabayashi | 362/31 |
| 2005/0013134 | A1 * | 1/2005 | Yoo et al. | 362/235 |
| 2006/0279957 | A1 * | 12/2006 | Kwon et al. | 362/378 |
| 2007/0177379 | A1 * | 8/2007 | Fu et al. | 362/217 |
| 2008/0303973 | A1 * | 12/2008 | Park et al. | 349/58 |
| 2009/0103281 | A1 * | 4/2009 | Koh | 362/97.1 |

* cited by examiner

Primary Examiner — Robert May
(74) Attorney, Agent, or Firm — Birch, Stewart, Kolasch & Birch, LLP (57) ABSTRACT

A display device capable of driving a scanning backlight is disclosed. The display device forms a conductive pattern on a balance printed circuit board (PCB) and sequentially controls the on/off time of light sources without assigning driving units to each of the light sources. As such, the display device can drive the scanning backlight and reduce manufacturing costs.

19 Claims, 5 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2008-0124911, filed on Dec. 9, 2008, which is hereby incorporated by reference in its entirety.

BACKGROUND

1. Field of the Disclosure

This disclosure relates to a liquid crystal display (LCD) device, and more particularly to an LCD device which can reduce manufacturing costs by forming a separate conductive pattern on a balance printed circuit board (PCB) to enable driving of a scanning backlight.

2. Description of the Related Art

In general, a liquid crystal display (LCD) device uses an optical anisotropic characteristic and a polarization characteristic of a liquid crystal material as a principle component in forming an image. Liquid crystal has a thin and lengthy molecular structure and exhibits the anisotropic characteristic of having directivity in an array and the polarization characteristic of the direction of a molecule array varying according to the size thereof when placed in an electric filed. A liquid crystal panel is an essential constituent element, including a pair of transparent insulation substrates. An electric field generation electrode is formed on each of surfaces of the transparent insulation substrates that face each other with respect to a liquid crystal layer interposed between the substrates. The arrangement direction of liquid crystal molecules is intentionally adjusted by a change in the electric field between the electric field generation electrodes. Accordingly, transmissivity of light is varied so that a variety of images can be displayed.

Since the liquid crystal panel is a device without a self-illuminating element and requires a separate light source, light is supplied by a backlight unit provided at a rear surface to form an image of a sufficient brightness to view. According to the arrangement method of an illumination lamp included in the backlight unit, the backlight unit may be classified into an edge type and a direct type. In the edge type backlight unit, an illumination lamp is arranged at an edge of one side of a rear surface of a liquid crystal panel and light of the illumination lamp is refracted by a light guide plate to be incident on the entire surface of the liquid crystal panel. In the direct type backlight unit, a plurality of illumination lamps are arranged on a rear surface of the liquid crystal panel and light of the illumination lamps is directly supplied over the entire surface of the liquid crystal panel.

The edge type backlight unit can be easily manufactured because a tube-like illumination lamp is installed at the side surface of the liquid crystal panel and light of the illumination lamp is supplied to the overall surface of the liquid crystal panel using a transparent light guide plate. In contrast, the direct type backlight unit does not need a light guide plate because light is emitted directly to the overall surface of a substrate and exhibits a high light use efficiency because a plurality of lamps can be used. Also, the direct type backlight unit is easy to handle and can be used for LCD devices having a large screen over 20 inches because there is no limit in the size of a display area.

Meanwhile, the LCD device having such backlight units is a hold type illumination so that complete moving picture display may be difficult. That is, when a moving picture is displayed with the LCD device, so-called motion blurring in the display of a moving picture, that is, moving picture contour degradation, may be generated due to the hold characteristic so that the image quality is deteriorated. Thus, to prevent the moving picture motion blurring in the display of a moving picture, that is, moving picture contour degradation, the LCD device of a backlight scanning system (a sequential driving system) using a direct type backlight unit in which a plurality of lamps are horizontally arranged has been suggested.

According to the LCD device of the scanning backlight driving system, the lamps are lit in synchronism with a start time of a scanning signal of a display image and simultaneously, when a brightness signal of the same level is supplied, the display brightness of the liquid crystal panel is set such that a time-integrated factor of a brightness value between frames can be equal. Thus, the LCD device of the scanning backlight driving system may achieve impulse type light emission (illumination) equivalent to a cathode ray tube (CRT) so that the moving picture contour degradation in the display of a moving picture may be prevented.

The scanning backlight driving system is a technique to turn off an unnecessary screen by instantly turning off the lamps when an image is displayed on the liquid crystal panel, which requires individual driving of the lamps. To individually drive the lamps, the lamps are electrically connected to an external inverter via a wire work so that a driving voltage generated by the inverter may be supplied to the lamps.

Although the scanning backlight driving system that individually turns the lamps on/off may prevent motion blurring (moving picture contour degradation), as the number of lamps that are individually driven increases, the burden of the wire work and a connection process of coupling a wire and the inverter increases, thus raising the manufacturing costs.

BRIEF SUMMARY OF THE INVENTION

Accordingly, embodiments of the present disclosure are directed to an LCD device that substantially obviates one or more of problems due to the limitations and disadvantages of the related art.

An object of an embodiment of the present invention is to provide an LCD device which can drive a scanning backlight while reducing manufacturing costs by forming a conductive pattern on a balance printed circuit board (PCB) and individually driving light sources arranged for each of predetermined areas of the LCD.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes a plurality of light sources configured to generate light, and to correspond to a plurality of areas of a liquid crystal panel; at least one balance printed circuit board configured to include, a plurality of sockets, in which an end portion of the respective plurality of light sources is connected, a first conductive pattern configured to be located at a first or second side of the plurality of sockets corresponding to a center one of the plurality of areas, a second conductive pattern configured to be located at the second or first side of the plurality of sockets corresponding to a remainder of the plurality of areas, and a connector configured to be electrically connected to the first and second conductive patterns; and first and second light source driving units to supply first and second light source driving voltages to the first and second conductive patterns, respectively, of the at least one balance printed circuit board.

According to another general aspect of the present embodiment, a backlight unit includes a plurality of light sources configured to generate light, and to correspond to a plurality of areas of a liquid crystal panel; at least one balance printed circuit board configured to include, a plurality of sockets, in which an end portion of the respective plurality of light sources is connected, a first conductive pattern configured to be located at a first or second side of the plurality of sockets corresponding to a center one of the plurality of areas, a second conductive pattern configured to be located at the second or the first side of the plurality of sockets corresponding to a remainder of the plurality of areas, a third conductive pattern configured to be located at a same side of the plurality of sockets corresponding to the remainder of the plurality of areas, a first connector configured to be electrically connected to the first and second conductive patterns, and a second connector configured to be electrically connected to the third conductive pattern; and a first light source driving unit to supply a first light source driving voltage to the first conductive pattern and the third conductive pattern via respectively the first and second connectors, and a second light source driving unit to supply a second light source driving voltage to the second conductive pattern via the first connector.

According to another general aspect of the present embodiment, a backlight unit includes a plurality of light sources configured to generate light, and to correspond to a plurality of areas of a liquid crystal panel; at least one balance printed circuit board configured to include: a plurality of sockets, in which an end portion of the respective plurality of light sources is connected, a first conductive pattern configured to be located at a first or second side of the plurality of sockets corresponding to a center one of the plurality of areas, a second conductive pattern configured to be located at the second or the first side of the plurality of sockets corresponding to a remainder of the plurality of areas, a first connector configured to be electrically connected to the first conductive pattern, and a second connector configured to be electrically connected to the second conductive pattern; and a first light source driving unit to supply a first light source driving voltage to the first conductive pattern via the first connector, and a second light source driving unit to supply a second light source driving voltage to the second conductive pattern via the second connector.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the present disclosure and together with the description serve to explain the disclosure. In the drawings.

DETAILED DESCRIPTION OF THE EMBODIMENTS

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 1:
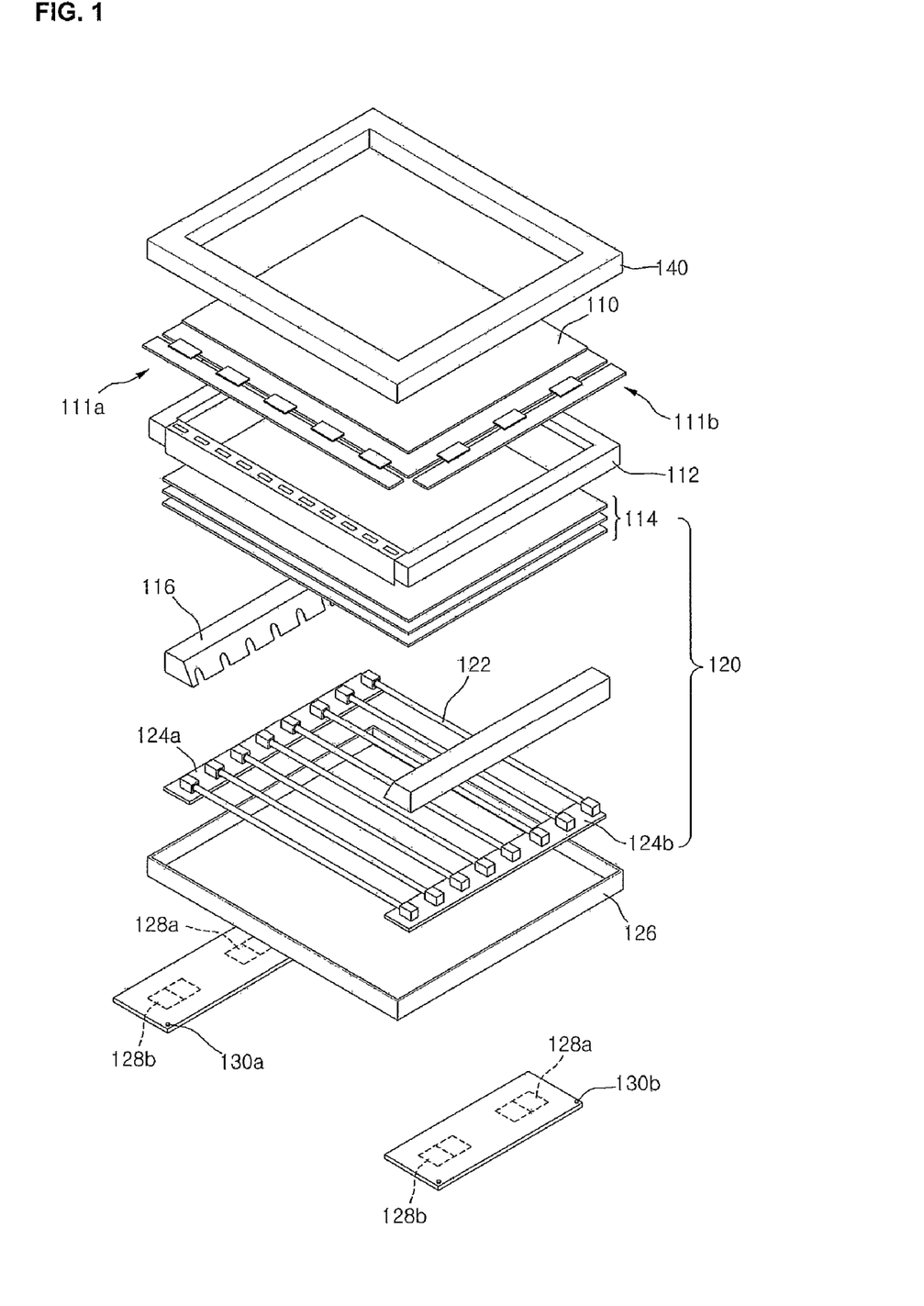
FIG. 1 is an exploded perspective view of an LCD device according to an embodiment of the present disclosure.

FIG. 1 is an exploded perspective view of a liquid crystal display (LCD) device according to an embodiment of the present disclosure. Referring to FIG. 1, the LCD device according to the present embodiment includes upper and lower substrates arranged to face each other and respectively having an electrode for generating an electric field, a liquid crystal layer formed between the upper and lower substrates, and a liquid crystal panel 110 connected to first and second printed circuit boards (PCBs) 111a and 111b which supply a scan signal and a data signal to a gate line and a data line formed on the lower substrate. In detail, the gate line and the data line are arranged to cross each other on the lower substrate, defining a pixel area. A thin film transistor (TFT) that is a switching device is formed in each pixel area. Color filters corresponding to the pixel area are sequentially, repeatedly formed on the upper substrate.

A backlight unit 120 supplying light to the liquid crystal panel 110 is formed on the rear surface of the liquid crystal panel 110. The backlight unit 120 is of a direct type, in which a plurality of lamps 122 (light sources) are arranged parallel to one another at the same interval. A plurality of optical sheets 114 diffusing light emitted from the lamps 122 to improve a viewing angle is deposited above the lamps 122.

The LCD device is modularized by a guide panel 112 having a rectangular frame shape housing the edge portions of the liquid crystal panel 110 and the backlight unit 120, a bottom cover 126 supporting the side and rear surfaces of the backlight unit 120, a top case 140 having a rectangular frame shape housing the edge of the front surface of the liquid crystal panel 110 and coupled to the guide panel 112, and a variety of coupling members (not shown) coupled to these elements. In the coupling structure of the lamps 122 of the backlight unit 120, one end of each of the lamps 122 is coupled to a first balance PCB 124a while the other end thereof is coupled to a second balance PCB 124b. A support side 116 covers each of the first and second balance PCBs 124a and 124b from the above. The support side 116 is coupled to each side of the bottom cover 126 supporting the read and side surfaces of the backlight unit 120.

First and second inverter PCBs 130a and 130b, on which the first and second inverters 128a and 128b for supplying a lamp driving voltage to the lamps 122 are respectively mounted, are formed on the rear surface of the bottom cover 126. The first and second inverters 128a and 128b are mounted on each of the first and second inverter PCBs 130a and 130b, by being separated a predetermined distance from each other. The first and second lamp driving voltages respectively generated from the first and second inverters 128a and 128b have the same phase. The second lamp driving voltage generated by the second inverter 128b is delayed for a predetermined time compared to the first lamp driving voltage generated by the first inverter 128a.

Figure 2:
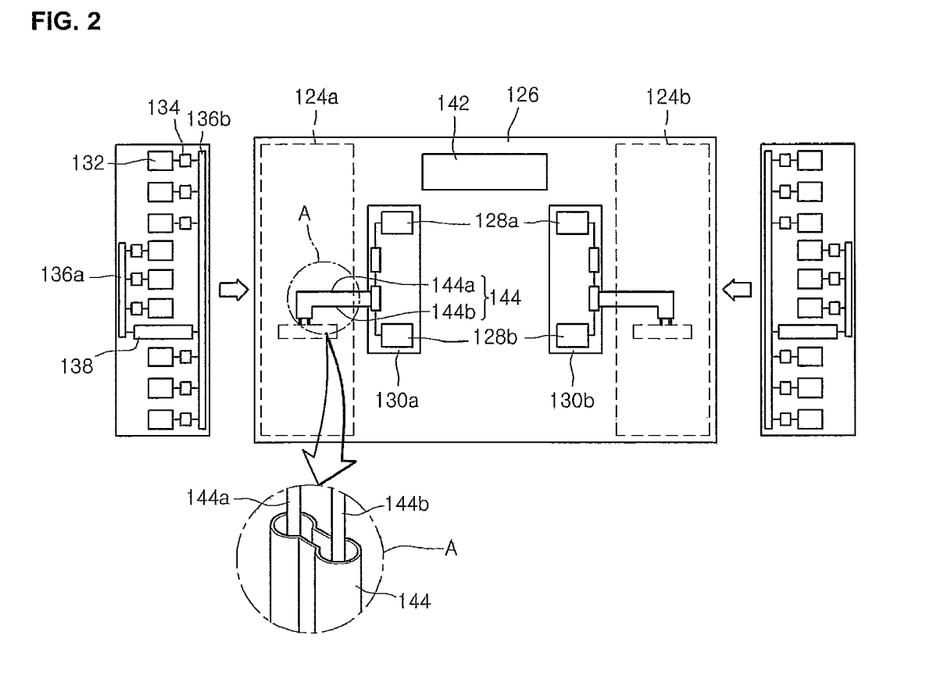
FIG. 2 schematically illustrates the rear surface of the LCD device of FIG. 1.
Figure 3:
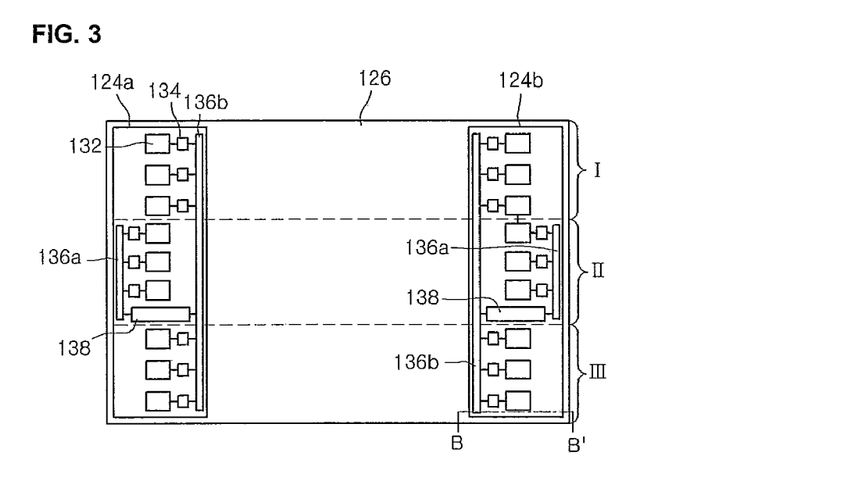
FIG. 3 is a plan view illustrating that first and second balance PCBs according to an embodiment of the present disclosure are mounted in the bottom cover of FIG. 1.

FIG. 2 schematically illustrates the rear surface of the LCD device of FIG. 1. FIG. 3 is a plan view illustrating that first and second balance PCBs according to an embodiment of the present disclosure are mounted in the bottom cover of FIG. 1. Referring to FIGS. 1-3, a main PCB 142, in which a timing controller (not shown) is mounted, the first and second inverter PCBs 130a and 130b separated a predetermined distance from each other are arranged on the rear surface of the bottom cover 126 of the LCD device. The timing controller controls the first and second PCBs 111a and 111b attached to the liquid crystal panel 110 of FIG. 1.

The main PCB 142 may include the timing controller that controls the timing of the driving unit mounted on the first and second PCBs 111a and 111b attached to the liquid crystal panel 110, and a power supply unit (not shown) that generates driving voltages. The driving voltages are applied to the liquid crystal panel 110, the driving unit, the timing controller, and the first and second inverters 128a and 128b mounted on each of the first and second inverter PCBs 130a and 130b, using an input voltage Vin from an external system. The first and second inverters 128a and 128b are mounted on each of the first and second inverter PCBs 130a and 130b. The first and second inverters 128a and 128b generate first and second lamp driving voltages and supply the generated first and second lamp driving voltages to the lamps 122 of FIG. 1. The lamps 122 may be cold cathode fluorescent lamps (CCFLs). Alternatively, the lamps 122 can include external electrode fluorescent lamps (EEFLs), respectively.

In detail, the first and second lamp driving voltages generated by the first and second inverters 128a and 128b are supplied to the lamps 122 via first and second high voltage wires 144a and 144b positioned within an insulation tube 144. The insulation tube 144 is connected to the first and second inverters 128a and 128b and a connector 138 mounted on the first and second inverters 128a and 128b of FIG. 1. The insulation tube 144 includes the first and second high voltage wires 144a and 144b through which the respective first and second lamp driving voltages generated by the respective first and second inverters 128a and 128b are supplied. The first and second high voltage wires 144a and 144b are fixedly inserted in the insulation tube 144 that maintains an interval therebetween. To have the first and second high voltage wires 144a and 144b maintain a predetermined interval therebetween, the insulation tube 144 is mold manufactured such that an insertion portion, in which the first and second high voltage wires 144a and 144b are inserted, may be separated by a pressed center portion of the insulation tube 144.

The first and second balance PCBs 124a and 124b are located at the left and right sides of the inside of the bottom cover 126. The first balance PCB 124a includes a plurality of lamp sockets 132 soldered parallel to the lengthwise direction of the first balance PCB 124a, in which ends of one side of the lamps 122 are inserted, and first and second conductive patterns 136a and 136b formed at the left and right sides (opposite sides) of the lamp sockets 132. Also, a capacitor 134 to balance the lamp driving voltage supplied to the lamps 122 is mounted on the first balance PCB 124a so that the lamps 122 inserted in the lamp sockets 132 may have a uniform brightness. Each capacitor 134 is electrically connected to respective ones of the lamp sockets 132 and respective ones of the first and second conductive patterns 136a and 136.

The second balance PCB 124b has the same structure as that of the first balance PCB 124a. The first conductive pattern 136a is located at the center portion (intermediate portion) of each of the first and second balance PCBs 124a and 124b in the lengthwise direction. The second conductive pattern 136b extends in the lengthwise direction of each of the first and second balance PCBs 124a and 124b.

The liquid crystal panel 110 of FIG. 1 is divided into first through third areas I-III. The first and second conductive patterns 136a and 136b are both formed in the second area II, while only the second conductive pattern 136b is formed in the first and third areas I and III in this embodiment. The connector 138 electrically connected to the first and second conductive patterns 136a and 136b is mounted on each of the first and second balance PCBs 124a and 124b. In detail, the connecter 138 is formed in a portion corresponding to the second area II in this embodiment, though not required, and is electrically connected to the first and second conductive patterns 136a and 136b.

One side of the connector 138 is electrically connected to the first conductive pattern 136a and the other side of the connector 138 is electrically connected to the second conductive pattern 136b. Also, by inserting the insulation tube 144 around the connector 138, the connector 138 is connected to the first and second high voltage wires 144a and 144b of the insulation tube 144. The first lamp driving voltage from the first inverter 128a is supplied to the first high voltage wire 144a. The second lamp driving voltage from the second inverter 128b is supplied to the second high voltage wire 144b.

Since one side of the connector 138 is electrically connected to the first high voltage wire 144a, the first lamp driving voltage is supplied to the first conductive pattern 136a via the first high voltage wire 144a. Since the other side of the connector 138 is electrically connected to the second high voltage wire 144b, the second lamp driving voltage is supplied to the second conductive pattern 136b via the second high voltage wire 144. Since the first lamp driving voltage is supplied to the first conductive pattern 136a and the second lamp driving voltage is supplied to the second conductive pattern 136b, the first lamp driving voltage is supplied to the lamp socket 132 connected to the first conductive pattern 136a and the second lamp driving voltage is supplied to the lamp socket 132 connected to the second conductive pattern 136b.

As a result, the lamps 122 inserted in the lamp sockets 132 corresponding to the second area II generate light by the first lamp driving voltage supplied via the first conductive pattern 136a. The lamps 122 inserted in the lamp sockets 132 corresponding to the first and third area I and III generate light by the second lamp driving voltage supplied via the second conductive pattern 136b.

As described above, the first and second lamp driving voltages have the same phase and are supplied to the first and second conductive patterns 136a and 136b by being delayed for a predetermined time relative to each other. For example, when the second lamp driving voltage is output by being delayed for a predetermined time compared to the first lamp driving voltage, the lamps 122 located in the second area II, to which the first lamp driving voltage is supplied, are first driven and then the lamps 122 located in the first and third areas I and III are subsequently driven.

Accordingly, since the lamps 122 located in the second area II of the liquid crystal panel 110 are first driven and then the lamps 122 located in the first and third areas I and III of the liquid crystal panel 110 are driven, the LCD device according to the present embodiment may perform scanning backlight driving. Thus, since the LCD device according to the present embodiment may perform the scanning backlight driving by using the first and second conductive patterns 136a and 136b located on the first and second balance PCBs 124a and 124b, in spite of an increase in the number of lamps, the burden of the wire work, and a process of coupling the wire work and the inverter 138 may be reduced so that the manufacturing costs of products can be reduced.

Figure 4:
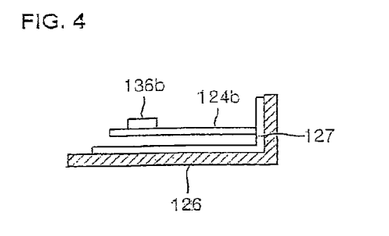
FIG. 4 is a cross-sectional view taken along line B-B' of FIG. 3.

FIG. 4 is a cross-sectional view taken along line B-B' of FIG. 3. Referring to FIGS. 3 and 4, the second balance PCB 124b is located at the right side of the bottom cover 126. Since the second conductive pattern 136b that is formed of a metal material is formed on the second balance PCB 124b, an insulation layer 127 is formed between the second balance PCB 124b and the bottom cover 126, for the insulation from the bottom cover 126. The insulation layer 127 extends from an accommodation portion of the bottom cover 126, in which the second balance PCB 124b is accommodated, to a side portion of the bottom cover 126. The insulation layer 127 is formed not only at the portion where the second balance PCB 124b is formed but also at a portion where the first balance PCB 124a is formed.

Figure 5:
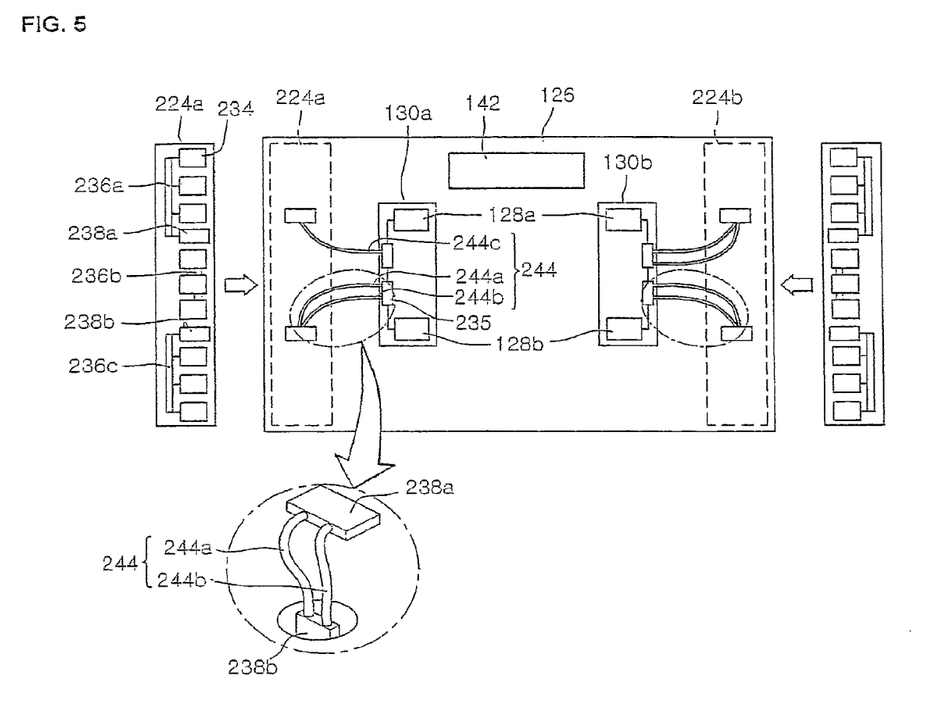
FIG. 5 illustrates the rear surface of the LCD device according to another embodiment of the present disclosure.
Figure 6:
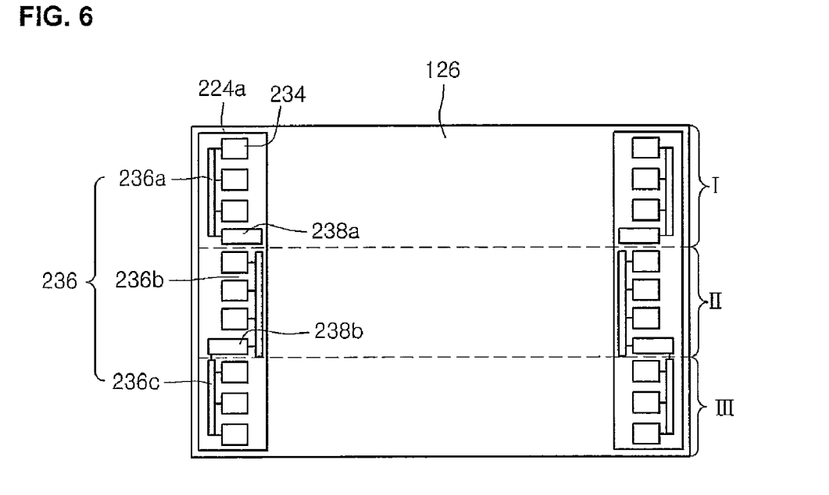
FIG. 6 is a plan view illustrating that the first and second balance PCBs are mounted in the bottom cover of FIG. 5.

FIG. 5 illustrates the rear surface of the LCD device according to another embodiment of the present disclosure. FIG. 6 is a plan view illustrating that the first and second balance PCBs are mounted in the bottom cover of FIG. 5. Since the base structure and lamp driving principle of an LCD device according to the present embodiment are the same as those of the above-described embodiment, the descriptions of the same base structure and the lamp driving principle will be omitted herein.

Referring to FIG. 5, the first and second inverter PCBs 130a and 130b that are separated a predetermined distance from each other, and the main PCB 142, are located at the rear surface of the bottom cover 126. The timing controller to control the driving unit mounted on the first and second PCBs 111a and 111b attached to the LCD 110 of FIG. 1, and the power supply unit to generate various driving voltages, are mounted on the main PCB 142.

The first and second inverters 128a and 128b mounted on each of the first and second inverter PCBs 130a and 130b, generate the first and second lamp driving voltages and supply the generated first and second lamp driving voltages to the lamps 122 of FIG. 1. The lamps 122 may be EEFL. The first and second lamp driving voltages generated by the first and second inverters 128a and 128b are finally supplied to the lamps 122 via a connection line 244. The connection line 244 includes first and second connection wires 244a and 244b through which the first and second lamp driving voltages are supplied. The connection line 244 (i.e., the first and second connection wires 244a and 244b) is connected to first and second connector connection terminals 235a and 235b.

First and second balance PCBs 224a and 224b are located at the left and right sides of the inside of the bottom cover 126. A plurality of lamp sockets 234, in which end portions of the lamps 122 are inserted, are soldered to the first and second balance PCBs 224a and 224b, parallel to one another and in the lengthwise direction of each of the first and second balance PCBs 224a and 224b. First and second connectors 238a and 238b electrically connected to the lamp sockets 234 are respectively mounted on each of the first and second balance PCBs 224a and 224b. The first and second connectors 238a and 238b mounted on each of the first and second balance PCBs 224a and 224b are connected to the connection line 244. In detail, the first and second connectors 238a and 238b, mounted on the first and second balance PCBs 224a and 224b, are connected to any one of the first and second connector connection terminals 235a and 235b that are connected to respective ends of the connection line 244, since the first and second connector connection terminals 235a and 235b have the same structure. As shown in FIG. 5, the second connectors 238b are connected to the second connector connection terminal 235b. The first and second connector connection terminals 235a and 235b may be plug type male connectors. The first and second connectors 238a and 238b mounted on the first and second balance PCBs 224a and 224b may be socket type female connectors.

First through third conductive patterns 236a-236c are formed on each of the first and second balance PCBs 224a and 224b. The first conductive pattern 236a is formed in the upper portion of each of the first and second balance PCBs 224a and 224b. The second conductive pattern 236b is formed in the center portion (intermediate portion) of each of the first and second balance PCBs 224a and 224b. The third conductive pattern 236c is formed in the lower portion of each of the first and second balance PCBs 224a and 224b. The bottom cover 126 is divided into first through third areas I-III. The first conductive pattern 236a is formed in the first area I. The second conductive pattern 236b is formed in the second area II. The third conductive pattern 236c is formed in the third area III.

Since the lamps 122 inserted in the lamp sockets 234 formed on the first and second balance PCBs 224a and 224b are external electrode fluorescent lamps (EEFLs), the effective areas of the first and second balance PCBs 224a and 224b are smaller compared to a case in which the lamps 122 are CCFLs. Thus, the first through third conductive patterns 236a-236c formed on each of the first and second balance PCBs 224a and 224b are formed one by one to correspond to each of the first through third areas I-III.

The first connector 238a is mounted at a boundary portion between the first and second conductive patterns 236a and 236b and electrically connected to the first conductive pattern 236a. The second connector 238b is mounted at a boundary portion between the second and third conductive patterns 236b and 236c and electrically connected to the second and third conductive patterns 236b and 236c.

While one side of the second connector 238b is electrically connected to the second conductive pattern 236b, the other side thereof is electrically connected to the third conductive pattern 236c. The first connector 238a is electrically connected to the first inverter 128a via the connection line 244. The second connector 238b is electrically connected to the first and second inverters 128a and 128b via the connection line 244.

The connection line 244 electrically connected between the first connector 238a and the first inverter 128a is configured by a single connection wire 244c, referred to as a third connection wire. Thus, the first lamp driving voltage output from the first inverter 128a is supplied to the first connector 238a via the connection wire 244c. The first lamp driving voltage supplied to the first connector 238a is supplied to the first conductive pattern 236a that is electrically connected to the first connector 238a. The lamps 122 inserted in the lamp sockets 234 that are electrically connected to the first conductive pattern 236a generate light by the first lamp driving voltage supplied to the first conductive pattern 236a.

The connection line 244 electrically connected between the second connector 238b and the first and second inverters 128a and 128b is configured by the first and second connection wires 244a and 244b. Thus, the first lamp driving voltage output from the first inverter 128a is supplied to one side of the second connector 238b via the first connection wire 244a. The second lamp driving voltage output from the second inverter 128b is supplied to the other side of the second connector 238b via the second connection wire 244b. The first lamp driving voltage supplied to the one side of the second connector 238b is supplied to the third conductive pattern 236c. The second lamp driving voltage supplied to the other side of the second connector 238b is supplied to the second conductive pattern 236b.

The lamps 122 inserted in the lamp sockets 234 that are electrically connected to the second conductive pattern 236b generate light by the second lamp driving voltage supplied to the second conductive pattern 236b. The lamps 122 inserted in the lamp sockets 234 that are electrically connected to the third conductive pattern 236c generate light by the first lamp driving voltage supplied to the third conductive pattern 236c.

As described above, the first and second lamp driving voltages have the same phase and are supplied to the first through third conductive patterns 136a-136c by being delayed for a predetermined time relative to each other. For example, when the second lamp driving voltage is output by being delayed for a predetermined time, compared to the first lamp driving voltage, the lamps 122 located in the first and third areas I and III, to which the first lamp driving voltage is supplied, are first driven, and then the lamps 122 located in the second area II are subsequently driven.

Accordingly, since the lamps 122 located in the first and third areas I and III are first driven and then the lamps 122 located in the second area II are driven, the LCD device according to the present embodiment may perform the scanning backlight driving.

Thus, since the LCD device according to the present embodiment may perform the scanning backlight driving by forming the first through third conductive patterns 236a-236c on both the first and second balance PCBs 224a and 224b, in spite of an increase in the number of lamps, the burden of the wire work and the process of coupling the wire work and the inverter may be reduced so that the manufacturing costs of products can be reduced.

Figure 7:
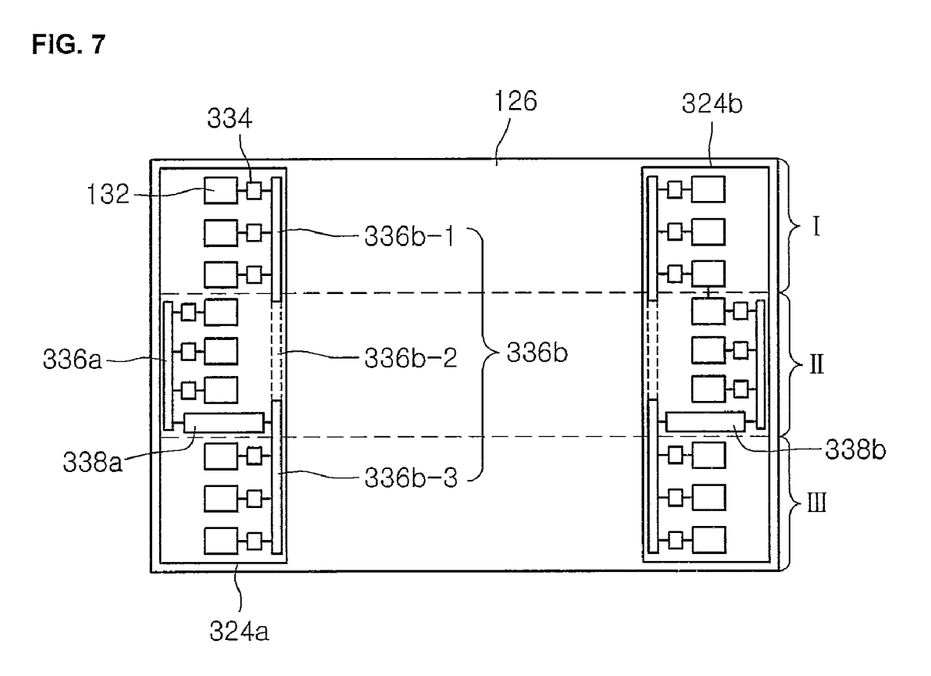
FIG. 7 is a plan view illustrating that first and second balance PCBs according to another embodiment of the present disclosure are mounted in the bottom cover of FIG. 1.

FIG. 7 is a plan view illustrating that first and second balance PCBs according to another embodiment of the present disclosure are mounted in the bottom cover of FIG. 1. Since the base structure and lamp driving principle of an LCD device according to the present embodiment are the same as those of the above-described first embodiment, the descriptions of the same base structure and the lamp driving principle will be omitted herein.

Referring to FIGS. 1 and 7, first and second balance PCBs 324a and 324b are mounted at the left and right sides of the inside of the bottom cover 126. In each of the first and second balance PCBs 324a and 324b, the lamp sockets 132, in which end portions of the lamps 122 of FIG. 1 are inserted, are soldered parallel to one another and in the lengthwise direction of each of the first and second balance PCBs 324a and 324b, and the capacitor 134 to balance the lamp driving voltage supplied to the lamps 122 is mounted so that the lamps 122 inserted in the lamp sockets 132 may have a uniform brightness. The lamps 122 may be CCFLs. Alternatively, The lamps 122 can include external electrode fluorescent lamps (EEFLs).

The first and second balance PCBs 324a and 324b are located at the left and right sides (or opposite ends) of the inside of the bottom cover 126. The lamp sockets 334, in which end portions of the lamps 122 are inserted, are soldered to each of the first and second balance PCBs 324a and 324b, parallel to one another and in the lengthwise direction of each of the first and second balance PCBs 324a and 324b. Also, first and second connectors 338a and 338b electrically connected to the lamp sockets 132 are mounted on the first and second balance PCBs 324a and 324b.

Also, first and second conductive patterns 336a and 336b are formed on each of the first and second balance PCBs 324a and 324b. The second conductive pattern 336b is divided into first through third areal conductive patterns 336b-1 to 336b-3. The first conductive pattern 336a is formed on each of the first and second balance PCBs 324a and 324b at a position corresponding to the center portion (intermediate portion) of the bottom cover 126. The first areal conductive pattern 336b-1 of the second conductive pattern 336b is formed on each of the first and second balance PCBs 324a and 324b at a position corresponding to the upper portion of the bottom cover 126. The third areal conductive pattern 336b-3 is formed on each of the first and second balance PCBs 324a and 324b at a position corresponding to the lower portion of the bottom cover 126. The second areal conductive pattern 336b-2 is formed on the rear surface of each of the first and second balance PCBs 324a and 324b at a position corresponding to the center portion of the bottom cover 126. Accordingly, the second areal conductive pattern 336b-2 is shown with broken lines in FIG. 7.

The first and third areal conductive patterns 336b-1 and 336b-3 are electrically connected by the second areal conductive pattern 336b-2 formed on the rear surface of each of the first and second balance PCBs 324a and 324b. In other embodiments of the present invention, the first and third areal conductive patterns 336b-1 and 336b-3 may be connected by a wire or other connection.

The first through third areal conductive patterns 336b-1 to 336b-3 forming the second conductive pattern 336b are formed on the front surface and the rear surface (or on opposite surfaces) of each of the first and second balance PCBs 324a and 324b because the effective area of each of the first and second balance PCBs 324a and 324b is insufficient. That is, due to the slimming of LCD devices, since it is difficult to form two conductive patterns at the left and right sides of the first and second balance PCBs 324a and 324b, the second areal conductive pattern 336b-2 is formed on the rear surface of each of the first and second balance PCBs 324a and 324b.

The bottom cover 126 is divided into the first through third areas I-III. The first areal conductive pattern 336b-1 of the second conductive pattern 336b is correspondingly formed in the first area I. The first conductive pattern 336a and the second areal conductive pattern 336b-2 of the second conductive pattern 336b are correspondingly formed in the second area II. Also, the second areal conductive pattern 336b-2 is formed on a different side of the first balance PCB 324a from the first conductive pattern 336a. The third areal conductive pattern 336b-3 of the second conductive pattern 336b is correspondingly formed in the third area III.

A connector 338 (i.e., 338a and 338b) electrically connected to the first and second conductive patterns 336a and 336b are mounted on the first and second balance PCBs 324a and 324b. The connector 338 is formed in a portion corresponding to the second area II and electrically connected to the first and second conductive patterns 336a and 336b. However, the placement of the connector 338 need not only be in the second area II.

In detail, while one side of the connector 338 (e.g., 338a) is electrically connected to the first conductive pattern 336a, the other side thereof is electrically connected to the third areal conductive pattern 336b-3 of the second conductive pattern 336b. Also, the connector 338 is electrically connected to the first and second high voltage wires 144a and 144b of FIG. 2 of the insulation tube 144 of FIG. 2 that are respectively and electrically connected to the first and second inverters 128a and 128b of FIG. 2. In other embodiments, the connector 338 (e.g., 338a) may be electrically connected second areal conductive pattern 336b-2 of the second conductive pattern 336b by a connection through the first and second balance PCBs 324a and 324b. Various embodiments of the present invention may have such a connection through the balance PCB.

The first lamp driving voltage from the first inverter 128a of FIG. 2 is supplied to the first high voltage wire 144a of FIG. 2 and the second lamp driving voltage from the second inverter 128b of FIG. 2 is supplied to the second high voltage wire 144b of FIG. 2. Since one side of the connector 338 is electrically connected to the first high voltage wire 144a, the first lamp driving voltage is supplied to the first conductive pattern 336a via the first high voltage wire 144a.

Since the other side of the connector 338 is electrically connected to the second high voltage wire 144b, the second lamp driving voltage is supplied to the third areal conductive pattern 336b-3 of the second conductive pattern 336b. The first lamp driving voltage supplied to the third areal conductive pattern 336b-3 is supplied to the first areal conductive pattern 336b-1 via the second areal conductive pattern 336b-2.

Since the first lamp driving voltage is supplied to the first conductive pattern 336a and the second lamp driving voltage is supplied to the second conductive pattern 336b, the first lamp driving voltage is supplied to the lamp sockets 132 connected to the first conductive pattern 336a, and the second lamp driving voltage is supplied to the lamp sockets 132 connected to the second conductive pattern 336b.

Accordingly, the lamps 122 of FIG. 1 inserted in the lamp sockets 132 corresponding to the second area II generate light by the first lamp driving voltage supplied via the first conductive pattern 336a. The lamps 122 inserted in the lamp sockets 132 corresponding to the first and third areas I and III generate light by the second lamp driving voltage supplied via the first and third areal conductive patterns 336b-1 and 336b-3 of the second conductive pattern 336b.

As described above, the first and second lamp driving voltages have the same phase and are supplied to the first and second conductive patterns 336a and 336b by being delayed for a predetermined time relative to each other. For example, when the second lamp driving voltage is output by being delayed for a predetermined time, compared to the first lamp driving voltage, the lamps 122 located in the second area II, to which the first lamp driving voltage is supplied, are first driven, and then the lamps 122 located in the first and third areas I and III are subsequently driven.

Accordingly, since the lamps 122 located in the second area II of the liquid crystal panel 110 are first driven and then the lamps 122 located in the first and third areas I and III of the liquid crystal panel 110 are driven, the LCD device according to the present embodiment may perform scanning backlight driving.

Figure 8:
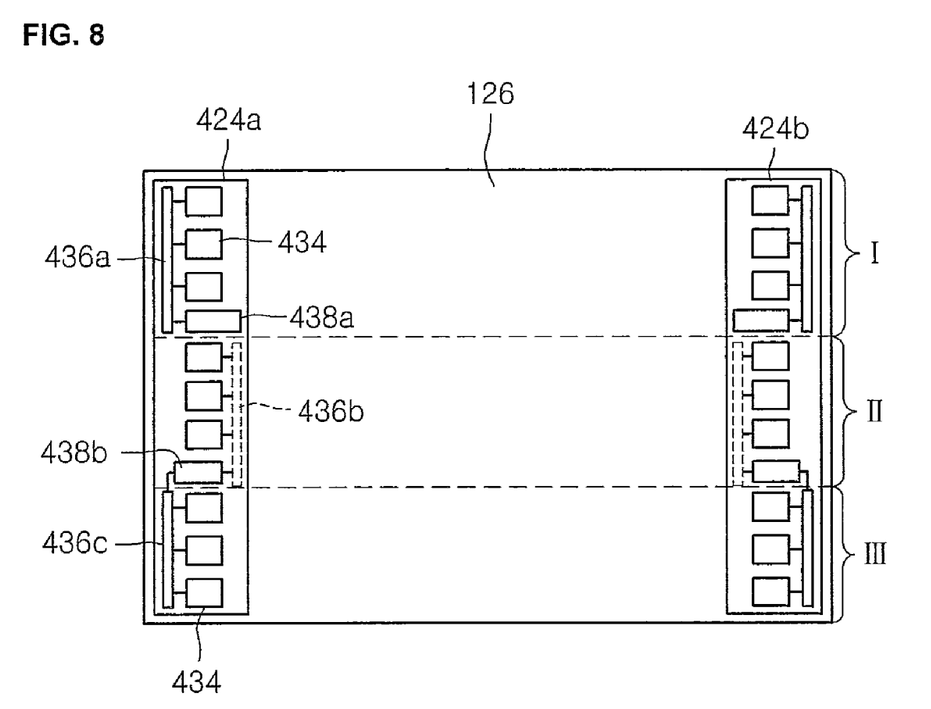
FIG. 8 is a plan view illustrating that first and second balance PCBs according to another embodiment of the present disclosure are mounted in the bottom cover of FIG. 1.

FIG. 8 is a plan view illustrating that first and second balance PCBs according to another embodiment of the present disclosure are mounted in the bottom cover of FIG. 1. Since the base structure and lamp driving principle of an LCD device according to the present embodiment are the same as those of the above-described second embodiment, the descriptions of the same base structure and the lamp driving principle will be omitted herein.

Referring to FIGS. 1 and 8, first and second balance PCBs 424a and 424b are located at the left and right sides of the inside of the bottom cover 126. In each of the first and second balance PCBs 424a and 424b, a plurality of lamp sockets 434, in which end portions of the lamps 122 of FIG. 1 are inserted, are soldered parallel to one another and in the lengthwise direction of each of the first and second balance PCBs 424a and 424b. Also, first and second connectors 438a and 438b electrically connected to the lamp sockets 434 are mounted on each of the first and second balance PCBs 424a and 424b. The lamps 122 may be EEFLs, or other types of lamps.

First through third conductive patterns 436a-436c are formed on each of the first and second balance PCBs 424a and 424b. The first conductive pattern 436a is formed on the front surface of each of the first and second balance PCBs 424a and 424b at a position corresponding to the upper portion of each of the first and second balance PCBs 424a and 424b. The second conductive pattern 436b is formed on the rear surface of each of the first and second balance PCBs 424a and 424b at a position corresponding to the center portion of each of the first and second balance PCBs 424a and 424b. Also, the third conductive pattern 436c is formed on the front surface of each of the first and second balance PCBs 424a and 424b at a position corresponding to the lower portion of each of the first and second balance PCBs 424a and 424b.

The bottom cover 126 is divided into the first through third areas I-III. The first conductive pattern 436a is correspondingly formed in the first area I. The second conductive pattern 436b is correspondingly formed in the second area II. The third conductive pattern 436c is correspondingly formed in the third area III.

Since the lamps 122 of FIG. 1 inserted in the lamp sockets 234 formed on the first and second balance PCBs 424a and 424b are EEFLs, the effective areas of the first and second balance PCBs 424a and 424b are smaller compared to a case in which the lamps 122 are CCFLs. Also, as the LCD device is gradually made slim, the effective areas of the first and second balance PCBs 424a and 424b are insufficient.

Thus, the first through third conductive patterns 436a-436c formed on the first and second balance PCBs 424a and 424b are correspondingly formed in the first through third areas I-III. The second conductive pattern 436b is formed on the rear surface of each of the first and second balance PCBs 424a and 424b.

The first connector 438a is mounted on a boundary portion between the first and second balance PCBs 424a and 424b and electrically connected to the first conductive pattern 436a. The second connector 438b is mounted at a boundary portion between the second and third conductive patterns 436b and 436c and electrically connected to the second and third conductive patterns 436b and 436c. The placement of the first connector 438a and/or the second connector 438b may also be at other areas of the first and second balance PCBs 424a and 424b.

While one side of the second connector 438b is electrically connected to the second conductive pattern 436b that is formed on the rear surface of each of the first and second balance PCBs 424a and 424b, the other side thereof is electrically connected to the third conductive pattern 436c that is formed on the front surface of each of the first and second balance PCBs 424a and 424b. The first connector 438a is electrically connected to the first inverter 128a of FIG. 5 via the connection line 244 (i.e., the connection wire 244c). The second connector 438b is electrically connected to the first and second inverters 128a and 128b via the connection line 244 (i.e., the respective connection wires 244a and 244b).

The first lamp driving voltage output from the first inverter 128a is supplied to the first connector 438a via the connection wire 244c. The first lamp driving voltage supplied to the first connector 438a is supplied to the first conductive pattern 436a that is electrically connected to the first connector 438a. The lamps 122 of FIG. 1 inserted in the lamp sockets 434 that are electrically connected to the first conductive pattern 436a generate light by the first lamp driving voltage supplied to the first conductive pattern 436a.

The first lamp driving voltage output from the first inverter 128a is also supplied to one side of the second connector 438b. The second lamp driving voltage output from the second inverter 128b is supplied to the other side of the second connector 438b. The first lamp driving voltage supplied to the one side of the second connector 438b is supplied to the third conductive pattern 436c. The second lamp driving voltage supplied to the other side of the second connector 438b is supplied to the second conductive pattern 436b.

The lamps 122 inserted in the lamp sockets 434 that are electrically connected to the second conductive pattern 436b generate light by the second lamp driving voltage supplied to the second conductive pattern 436b. The lamps 122 inserted in the lamp sockets 434 that are electrically connected to the third conductive pattern 436c generate light by the first lamp driving voltage supplied to the third conductive pattern 436c.

As described above, the first and second lamp driving voltages have the same phase and are supplied to the first through third conductive patterns 436a-436c by being delayed for a predetermined time relative to each other. For example, when the second lamp driving voltage is output by being delayed for a predetermined time, compared to the first lamp driving voltage, the lamps 122 located in the first and third areas I and III, to which the first lamp driving voltage is supplied, are first driven and then the lamps 122 located in the second area II are subsequently driven.

Accordingly, since the lamps 122 located in the first and third areas I and III are first driven and then the lamps 122 located in the second area II are driven, the LCD device according to the present embodiment may perform the scanning backlight driving.

Thus, since the LCD device according to the present embodiment may perform the scanning backlight driving by forming the first through third conductive patterns 436a-436c on the first and second balance PCBs 424a and 424b, in spite of an increase in the number of lamps, the burden of the wire work and the process of coupling the wire and the inverter may be reduced so that the manufacturing costs of products can be reduced.

As described above, according to the present disclosure, since a conductive pattern is formed on a balance PCB and a high voltage from an inverter is supplied to the conductive pattern via high voltage wires separated a predetermined distance from each other, the scanning backlight driving is possible. Also, even when the number of lamps increases, the scanning backlight driving is possible by connecting the lamps and the conductive pattern. Thus, in spite of an increase in the number of lamps, the burden of the wire work and the process of coupling the wire and the inverter may be reduced so that the manufacturing costs of products can be reduced.

In various embodiments of the present invention, reference to a left side and a right side, a front and a rear, an upper part and a lower part should not in themselves be a limiting description. Rather, such references should be broadly construed as a first side and a second side, which may be opposite sides, a first surface and a second surface, which may be opposite surfaces, or a first part and a second part, which may be opposing parts.

In various embodiments, references to a first, second and/or third conductive pattern, and references to first and second connectors are made to distinguish between various elements so that such designations should not be construed as permanent designations. That is references to first, second and/or third is meant to distinguishing relative to each other, and not meant to be an absolute designation.

In various embodiments, references to lamps should be understood broadly to include any light source. Accordingly, references to lamp sockets should be broadly understood as being light source sockets or simply sockets, and lamp driving voltages should be broadly understood as being light source driving voltages.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A backlight unit, comprising:
a plurality of light sources configured to generate light, and to correspond to a plurality of areas of a liquid crystal panel;
at least one balance printed circuit board including
a plurality of sockets, in which an end portion of the respective plurality of light sources is connected,
a first conductive pattern configured to be located at a first or second side of the plurality of sockets corresponding to a center one of the plurality of areas,
a second conductive pattern configured to be located at the second or the first side of the plurality of sockets corresponding to a remainder of the plurality of areas, and
a connector configured to be electrically connected to the first and second conductive patterns; and
first and second light source driving units supplying first and second light source driving voltages to the first and second conductive patterns, respectively, of the at least one balance printed circuit board
wherein the first conductive pattern and the second conductive pattern are formed on the at least one balance printed circuit board.

2. The backlight unit of claim 1, wherein each of the plurality of light sources is a cold cathode fluorescent lamp (CCFL) or an external electrode fluorescent lamp (EEFL).

3. The backlight unit of claim 1, wherein the first and second light source driving units are configured to generate the first and second light source driving voltages that are output by being delayed for a predetermined time and have a same phase.

4. The backlight unit of claim 1, wherein the first and second light source driving units are configured to respectively supply the first and second light source driving voltages to the connector via an insulation tube having first and second high voltage wires.

5. The backlight unit of claim 4, wherein the first light source driving voltage from the first light source driving unit is configured to be supplied to the first conductive pattern that is connected to one side of the connector via the first high voltage wire, and the second light source driving voltage from the second light source driving unit is configured to be supplied to the second conductive pattern that is connected to the other side of the connector via the second high voltage wire.

6. The backlight unit of claim 4, wherein the insulation tube includes separate portions in which the first and second high voltage wires are connected, to maintain a constant interval between the first and second high voltage wires.

7. The backlight unit of claim 1, wherein the plurality of sockets corresponding to the remainder of the plurality of areas are electrically connected to each other by a connection.

8. The backlight unit of claim 7, wherein the connection is located on a surface of the at least one balance printed circuit board that is opposite from a surface having the plurality of sockets corresponding to the remainder of the plurality of areas.

9. The backlight unit of claim 1, wherein the plurality of sockets corresponding to the remainder of the plurality of areas are electrically connected to each other by a conductive pattern.

10. The backlight unit of claim 9, wherein the conductive pattern is located on a surface of the at least one balance printed circuit board that is opposite from a surface having the plurality of sockets corresponding to the remainder of the plurality of areas.

11. A backlight unit, comprising:
a plurality of light sources configured to generate light, and to correspond to a plurality of areas of a liquid crystal panel;
at least one balance printed circuit board including
a plurality of sockets, in which an end portion of the respective plurality of light sources is connected,
a first conductive pattern configured to be located at a first or second side of the plurality of sockets corresponding to a center one of the plurality of areas,
a second conductive pattern configured to be located at the second or the first side of the plurality of sockets corresponding to a remainder of the plurality of areas,
a third conductive pattern configured to be located at a same side of the plurality of sockets corresponding to the remainder of the plurality of areas,
a first connector configured to be electrically connected to the first and second conductive patterns, and
a second connector configured to be electrically connected to the third conductive pattern; and
a first light source driving unit supplying a first light source driving voltage to the first conductive pattern and the third conductive pattern via respectively the first and second connectors, and a second light source driving unit to supply a second light source driving voltage to the second conductive pattern via the first connector.

12. The backlight unit of claim 11, wherein the first conductive pattern is located on a surface of the at least one balance printed circuit board that is opposite from a surface having the plurality of sockets corresponding to the remainder of the plurality of areas.

13. The backlight unit of claim 11, wherein each of the plurality of light sources is a cold cathode fluorescent lamp (CCFL) or an external electrode fluorescent lamp (EEFL).

14. The backlight unit of claim 11, wherein the first and second light source driving units are configured to generate the first and second light source driving voltages that are output by being delayed for a predetermined time relative to each other and have a same phase.

15. The backlight unit of claim 11, wherein the first and second light source driving units are configured to respectively supply the first and second light source driving voltages via an insulation tube having first and second high voltage wires.

16. The backlight unit of claim 15, wherein the insulation tube includes separate portions in which the first and second high voltage wires are inserted, to maintain a constant interval between the first and second high voltage wires.

17. A backlight unit, comprising:
a plurality of light sources configured to generate light, and to correspond to a plurality of areas of a liquid crystal panel;
at least one balance printed circuit board including:
a plurality of sockets, in which an end portion of the respective plurality of light sources is connected,
a first conductive pattern configured to be located at a first or second side of the plurality of sockets corresponding to a center one of the plurality of areas,
a second conductive pattern configured to be located at the second or the first side of the plurality of sockets corresponding to a remainder of the plurality of areas,
a first connector configured to be electrically connected to the first conductive pattern, and
a second connector configured to be electrically connected to the second conductive pattern; and
a first light source driving unit supplying a first light source driving voltage to the first conductive pattern via the first connector, and
a second light source driving unit supplying a second light source driving voltage to the second conductive pattern via the second connector
wherein the first conductive pattern and the second conductive pattern are formed on the at least one balance circuit board.

18. The backlight unit of claim 17, wherein each of the plurality of light sources is a cold cathode fluorescent lamp (CCFL) or an external electrode fluorescent lamp (EEFL).

19. The backlight unit of claim 17, wherein the first and second light source driving units are configured to generate the first and second light source driving voltages that are output by being delayed for a predetermined time relative to each other and have a same phase.

\* \* \* \* \*